United States Patent [19]
Laney

[11] Patent Number: 5,824,728
[45] Date of Patent: Oct. 20, 1998

[54] IRON-FERRITE-FILLED POLYMER-BASED COMPOSITE MATERIAL AND METHOD OF MAKING THE SAME

[75] Inventor: Scot H. Laney, 3545 NW. 123rd Pl., Portland, Oreg. 97229

[73] Assignee: Scot H. Laney, Portland, Oreg.

[21] Appl. No.: 489,122

[22] Filed: Jun. 9, 1995

[51] Int. Cl.$^6$ .................................................. C08K 3/22
[52] U.S. Cl. ................... 524/435; 43/42.39; 252/62.54; 252/62.56; 273/58 J; 273/57.2
[58] Field of Search .................... 524/435, 431, 524/908; 523/515, 458, 137; 428/522; 252/62.54, 62.56; 273/58 J, 57.2; 43/42.39

[56] References Cited

U.S. PATENT DOCUMENTS

| | | | |
|---|---|---|---|
| 3,098,761 | 7/1963 | Westcott | 252/62.54 |
| 3,148,082 | 9/1964 | Ricco et al. | 524/431 |
| 3,638,347 | 2/1972 | Kochevar | 43/42.39 |
| 4,320,044 | 3/1982 | Nakamura | 524/431 |
| 4,690,960 | 9/1987 | Yamauchi et al. | 523/515 |
| 5,026,054 | 6/1991 | Osher et al. | 273/58 J |
| 5,578,670 | 11/1996 | Nakazawa et al. | 524/436 |

FOREIGN PATENT DOCUMENTS

| | | |
|---|---|---|
| 03-287652 | 12/1991 | Japan . |
| 7310017 | 1/1975 | Netherlands . |

Primary Examiner—Veronica P. Hoke
Attorney, Agent, or Firm—Kolisch Hartwell Dickinson McCormack & Heuser

[57] ABSTRACT

A curable, polymer-based composite material consists essentially of a first volume of a curable polymeric component such as a styrene butadiene copolymer and a second volume of iron ferrite particles. The composite material may be a sports article formed in a body with a shape that is rollable, generally spherical, with a specific gravity in the range of about 1.5–2.0, and with a size that accommodates use as a puck-like object for playing hockey. The body includes a central substantially uncured section and an outer substantially cured section. The composite material may also be used as a fishing weight or as a lead substitute, and is magnetizable. The composite material may also be used in a sound-dampening system that includes a first layer of less than one inch thick of the composite material, and a second layer of an expanded polymeric material bonded to the first layer. A method of forming said iron ferrite-filled rubber composite material is also disclosed.

6 Claims, 1 Drawing Sheet

IRON-FERRITE-FILLED POLYMER-BASED COMPOSITE MATERIAL AND METHOD OF MAKING THE SAME

BACKGROUND AND SUMMARY OF THE INVENTION

The present invention relates generally to dense rubber compositions, and to related processes for making the same. More particularly, the invention concerns a novel curable, iron-ferrite-filled, polymer-based composite material.

It is known to form a plastic material from desired polymer resins and fillers. Generally speaking, such plastic materials have relatively low density.

For applications which require high-density materials, plastic materials are generally unsatisfactory. A conventional material for such application is lead.

While lead has satisfactory density, the health risks associated with it have made it undesirable. One example of such an application for a lead-based material is use as a fishing weight. A recent problem has developed for such an application because many governmental authorities are presently considering whether to ban use of lead-containing fishing weights due to known health risks associated with the toxic nature of lead to water fowl.

Another high-density material application is for a low-rebound plastic puck for use in street hockey games. To meet the requirements for such an application, the material must have a suitably high density, and also exhibit a relatively low-rebound characteristic so that it does not tend to bounce away from the hockey stick during play. Conventional plastic materials exhibit an undesired, relatively high-rebound property that is undesirable for such an application.

Yet another high-density material application is for sound dampeners. Conventional sound dampeners require use of one or more, undesirably thick layers of material in the range of about one or more inches of thickness.

It is also desirable to be able to magnetize high-density materials.

Until now, there has not been proposed a composite material that overcomes the above drawbacks of conventional materials, or meets the above desired properties.

Accordingly, it is a principal object of the present invention to provide a composite material which overcomes the drawbacks of prior-art proposals.

Another object is to provide such a composite material that has a suitably high density for use as a substitute for lead.

Yet another object is to provide such a composite material that has a suitable low-rebound characteristic for use as a sports article such as a puck-like object for street hockey.

Another important object of the invention is to provide such a composite material that is an effective sound dampener at relatively low thickness of less than about one inch.

It is also an object of the invention to provide such a composite material that is magnetizable.

Yet another object is to provide such a composite material that can be cost-effectively manufactured.

In brief summary, one aspect of the invention includes a curable, polymer-based composite material consisting essentially of a first volume of a curable polymeric component, and a second volume of iron ferrite particles. Preferably, the polymeric component includes a styrene butadiene resin. However, any suitable natural or synthetic elastomer could be used.

Another aspect of the invention is a polymer-based sports article consisting essentially of a first volume of a curable polymeric component, and a second volume of iron ferrite particles. One version of this aspect of the invention is to form it in a shape that is rollable, generally spherical and with a specific gravity in the range of about 1.5–2.0, and preferably about 1.8, and with a size that accommodates use as a puck-like object for playing hockey. Another version of this aspect of the invention is to form it in a shape that accommodates use as a fishing weight, with the article having a specific gravity in the range of about 7.5 to 8.0.

Another aspect of the invention is a method of forming a filled rubber composite material. The method includes the steps of (1) selecting a first amount of curable rubber-based resin, (2) selecting an amount of filler, (3) reserving a fraction of the curable rubber-based resin from the first amount, (4) mixing the unreserved portion of the first amount of the curable rubber-based resin with the amount of filler, (5) adding the reserved second amount of the curable rubber-based resin to the mixture, and (6) repeating the mixing step. Preferably, the step of reserving a fraction of the curable rubber-based resin from the first amount of resin includes the step of cooling that fraction.

Another aspect of the invention is a sound-dampening system that includes a first layer of less than one inch thick of a cured polymer-based composite material consisting essentially of a first volume of a curable polymeric component and a second volume of iron ferrite particles, and a second layer of an expanded polymeric material bonded to the first layer.

Another aspect of the invention is a magnetizable, polymer-based composite material consisting essentially of a first volume of a curable polymeric component, and a second volume of iron ferrite particles.

These and other objects and advantages of the invention will be more clearly understood from a consideration of the accompanying drawings and the following description of the preferred embodiment.

DETAILED DESCRIPTION OF THE PREFERRED EMBODIMENT

Figure 1:
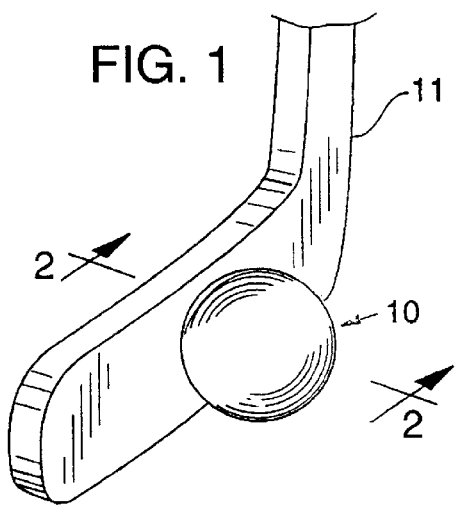
FIG. 1 is a fragmentary isometric view of the composite sports article of the present invention.

Before referring to the drawings, certain chemical and physical features of the invention will be described. The invention is a curable, polymer-based composite material consisting essentially of a first volume of a curable polymeric component, and a second volume of iron ferrite particles. The polymeric component preferably includes a styrene butadiene resin (SBR). Example formulations will be described below. An example of a relative volume ratio is 100parts polymeric component to 3,000 parts iron ferrite particles, and a method of forming the composite material will also be described. The relative volume ratio may vary depending on the application but, from the example, it should be clear that extremely high loading levels are possible using the to-be-described method of the invention.

For the remainder of the detailed description section, the term composite material will be used to refer to the above composite material of the invention.

Because of its high density, the composite material is usable as a lead substitute. The composite material is also moldable using conventional methods. The composite material is also magnetizable and millable after it is molded into a desired shape.

Figure 2:
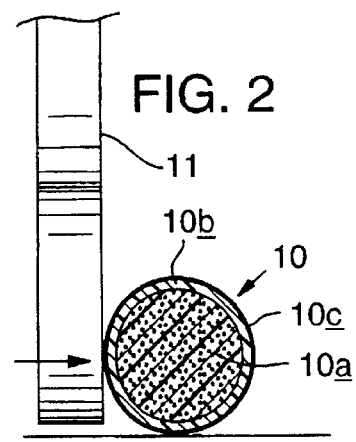
FIG. 2 is a fragmentary sectional view of the sports article of FIG. 1 through line 2—2.

Referring now to FIGS. 1–3, the polymer-based composite sports article of the present invention is shown being made according to its preferred embodiment and indicated generally at 10. Article 10 has a body that preferably includes a central, substantially uncured section 10a of the composite material, a first outer, substantially cured section 10b, and a second outer section, or overcoat, of a suitable paint or other suitable coating. As shown in FIGS. 1–2, the sports article is formed in a shape that is rollable, with a generally spherical shape, with a specific gravity in the range of about 1.5–2.0 and preferably about 1.8, and with a size that accommodates use as a puck-like object for playing hockey with a hockey stick 11, especially street hockey playable by participants using in-line skates and hockey sticks. Formation of composite material 10 into the puck-like sports article of the invention is performed using conventional rubber molding techniques such as by using the usual molds and hydraulic presses. Injection molding is the presently preferred way to mold material 10 into a puck-like object.

Figure 3A:
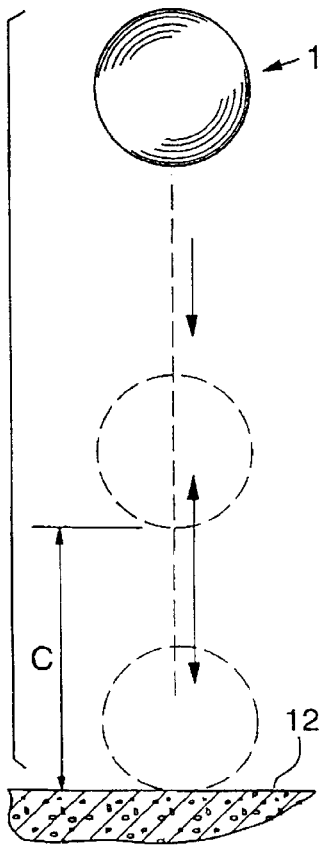
FIG. 3A is a side elevational view of a prior art ball showing its high-rebound characteristic.
Figure 3B:
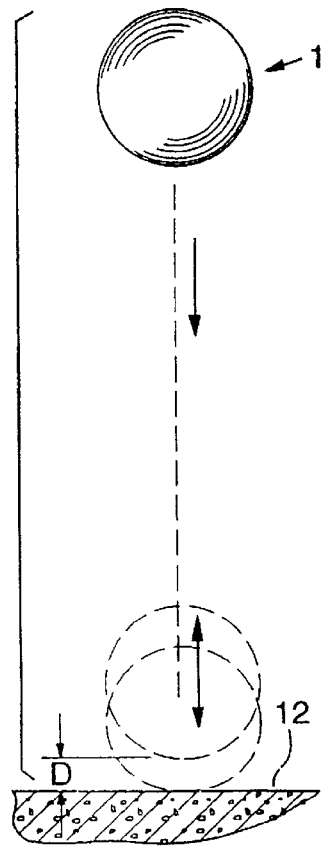
FIG. 3B is a side elevational view of the composite sports article of the invention showing its low-rebound characteristic.

Referring to FIGS. 3A–3B, the desired low-rebound feature of composite material 10 is shown (FIG. 3B) compared to certain high-rebound features of prior art materials (FIG. 3A). In FIG. 3A, a conventional ball such as a tennis ball is shown at 1 being dropped to a ground surface 12. After contacting surface 12, conventional ball 1 rebounds a distance C. In FIG. 3B, composite material 10 is shown being formed as the puck-like sports article of the invention. After contacting surface 12, puck-like object 10 rebounds a distance D from surface 12. Distances C and D in FIGS. 3A–3B are meant to show qualitatively the difference in rebound characteristics between conventional balls such as a tennis ball, and puck-like object 10. The quantitative difference will vary depending on the type of conventional ball used. When a tennis ball was used to compare with a 2.5-inch diameter puck-like object 10, with each being dropped to a ground surface such as concrete from a distance of about 5 feet, puck-like object 10 exhibited approximately 80% less rebound from the ground surface than the tennis ball exhibited from the same surface.

Referring back to FIG. 2, the low-rebound feature may also be thought of as a deformable feature of puck-like object 10. That section of the object closest to the hockey stick tends to deform upon impact, causing the object to have a tendency of staying near the stick, a desired quality for such an object.

Figure 4:
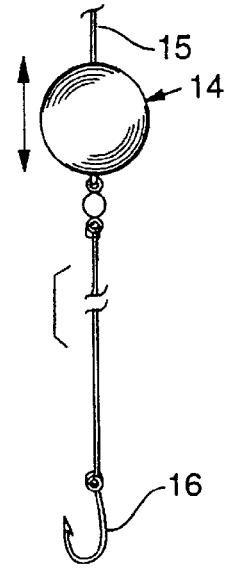
FIG. 4 is a fragmentary sectional view of the sound-dampening system of the invention.

Referring to FIG. 4, another embodiment of the polymer-based composite sports article of the present invention is shown as a fishing weight 14 fastened to fishing line 15 terminating in a hook 16. Fishing weight 14 may also be coated with paint or other desired coating as described in connection with the above puck-like sports article. Fishing weight 14 is formed in a suitable shape such as a spherical one with a central hole extending through it to allow fishing line to be threaded through the fishing weight. A conventional swivel like that shown in FIG. 4 can be tied to the fishing line to hold the weight in place. Preferably, fishing weight 14 has a specific gravity in the range of about 7.5 to 8.0.

Figure 5:
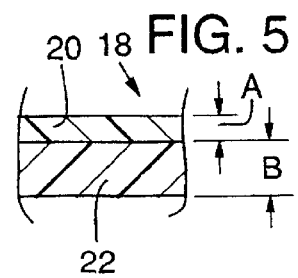
FIG. 5 is a fragmentary side view of the fishing weight of the present invention.

Referring to FIG. 5, a sound-dampening system feature of the invention is shown at 18, including a first layer 20 with a thickness A of less than one inch thick of the composite material, and a second layer 22 of a backing material such as an expanded polymeric material bonded to the first layer. The backing material is preferably expanded polymeric material may be polyethylene foam, but could be any suitable expanded or foam material, or other materials such as conventional dry wall. The two layers are bonded together using a suitable adhesive such as contact adhesives available from the 3M Company.

Operation and Preferred Method of Practicing the Invention

To form the polymer-based, and preferably rubber-based, composite material of the invention, the following method is performed. First, the method includes selecting a first amount of curable rubber-based resin, and selecting an amount of filler. Preferably, the rubber-based resin includes an SBR resin, and the filler is iron ferrite particles.

The method also includes the steps of reserving a fraction of the curable rubber-based resin from the first amount, and mixing the unreserved portion of the first amount of the curable rubber-based resin with the amount of filler. Next, the method includes adding the reserved second amount of the curable rubber-based resin to the mixture, and repeating the mixing step.

The reserving step may involve reserving plural fractions of the first amount of the curable rubber resin and, for such a case, the method will further include the step of performing the adding and repeating steps for each fraction.

Preferably, the reserving step includes cooling the reserved fraction of the first amount of the curable rubber resin. Generally speaking the cooling can be accomplished by reserving because the resin is warmed to a processing temperature in the mill. Where there are plural reserved fractions, then each reserved fraction is cooled.

EXAMPLE I

| Parts | Material |
| --- | --- |
| 110 | SBR 1712 |
| 20 | SBR 1009 |
| 5 | ZINC OXIDE |
| 2 | STERIC ACID POWDERED CURING AGENT |
| 1.5 | NAUGARD Q ANTI-OXIDANT |
| 3000 | IRON FERRITE POWDER |
| 20 | NEBONY 100 DESSICANT |
| 40 | CALIFLUX SP PLASTICIZER |
| 2.5 | SULFUR CURING AGENT |
| 1.5 | MBTS CURE ACCELERATOR |
| .35 | CUMATE CURE-CONTROLLING AGENT |

The above example produces a product with a specific gravity of about 7.5–8.0, and could be used for applications such as the fishing weight or the first layer of the sound dampening system. The relative parts of each component are by volume. The processing temperature may vary as required by batch size. For production batches of about 900–950 pounds, the preferred processing temperature is between about 200°–250° F. The above components are commercially available, and preferably the SBR resins are from Polysar, the zinc oxide from Azon, the Naugard Q anti-oxidant, Nebony 100 plasticizer and MBTS (2-mercaptobenzothiazyl disulfide) cure-controlling agent all from Harwick, the iron ferrite from Western Supply, and the Califlux SP plasticizer from H. M. Royal.

Numerous variations are possible with respect to blending of SBR resins, or choosing other suitable resins. With respect to Example I, the SBR 1712 resin is of the masterbatch type so that there is about 80 parts SBR and about 30 parts oil. The result is that Example I requires the usual 100 parts SBR.

With respect to the iron ferrite powder, any suitable particle size is acceptable, and 90 mesh (ASTM) has been found suitable.

Production batches of Example I can be made using a suitable mill or rotary mixer such as a Banbury mixer. The sequence of adding components may vary, but the cure-related components, particularly the sulfur and MBTS should be added last. Where practical, best results are obtained by pre-mixing the SBR 1712 and 1009 resins, reserving a fraction of about 30–50% of the pre-mixed resins, and then adding materials in the following sequence: (1) joint addition of zinc oxide, steric acid powder, and Naugard Q anti-oxidant, (2) joint addition of iron ferrite powder, Nebony 100 plasticizer, cumate cure-controlling agent, and Califlux SP plasticizer, (3) addition of the reserved fraction of pre-mixed SBR resins, and (4) joint addition of sulfur curing agent and MBTS cure accelerator.

By reserving the fraction of pre-mixed SBR resins, that fraction will drop in temperature substantially from the processing temperature, and temperature drops of about 50°–100° F. are possible. Reintroducing that fraction after addition of the iron ferrite powder has been found to be effective in allowing the resins to be loaded with such a high percentage of iron ferrite powder as in Example I.

When made with a production mill, Example I requires about 45-minutes for adequate mixing. When made with a rotary mixer such as a Banbury mixer, Example I requires about 5-minutes for adequate mixing. When mixing is complete, the material will have a sheet-like appearance (mill mix) or a crumb-like appearance (Banbury mixer). When mixed using a Banbury mixer, the material is preferably dispensed from that mixer into a mill to produce a sheet-like form.

With respect to curing and molding of material 10 into desired shapes such as the puck-like sports article of the invention, any suitable rubber curing/molding techniques can be used. The preferred cure temperature is about 325° F.

An important change to the conventional curing method is that material 10 is substantially undercured. For example, when a 2.5-inch diameter puck-like object is formed using material 10, it should be cured for about 12 minutes at 325° F.

Referring back to FIG. 2, that cure time will produce the desired central, substantially uncured section 10*a* of the composite material, and the first outer, substantially cured section 10*b*. Section 10*b* may also be thought of as a skin section.

In general, material 10 is preferably undercured by curing it only for approximately 20–30% of the usual required time at the required temperature. Even though material 10 is undercured, it has been surprisingly effective for use in the applications described above.

EXAMPLE II

| Parts | Material |
|---|---|
| 110 | SBR 1712 |
| 20 | SBR 1009 |
| 5 | ZINC OXIDE |
| 2 | STERIC ACID POWDERED CURING AGENT |
| 1.5 | NAUGARD Q ANTI-OXIDANT |
| 130 | IRON FERRITE POWDER |
| 20 | NEBONY 100 DESSICANT |
| 40 | CALIFLUX SP PLASTICIZER |
| 2.5 | SULFUR CURING AGENT |
| 1.5 | MBTS CURE ACCELERATOR |
| .35 | CUMATE CURE-CONTROLLING AGENT |

The above example produces a product with a specific gravity of about 1.5–2.0, and could be used for applications such as the hockey puck-like sports article. The processing temperature is again preferably about 200°–250° F. The materials are the same as those described in connection with Example I. The only change relative to the two examples is that substantially less iron ferrite powder is used. The reserving step can be used for Example II but, due to the substantial drop in relative percentage of iron ferrite powder, there is less need to use that step to achieve adequate dispersion of the iron ferrite powder in the resin.

The present invention therefore achieves the above objects by providing a polymer-based composite material which overcomes the drawbacks of prior-art proposals. The composite material has a suitably high density for use as a substitute for lead. It also has a suitable low-rebound characteristic for use as a sports article such as a hockey puck. The composite material also can be used as an effective sound dampener at relatively low thickness of less than about one inch. The composite material is also moldable and, in its resulting molded form, it is magnetizable and millable. The composite material is also capable of being cost-effectively manufactured.

Other application for the composite material include: (1) ballast devices, and particularly those used to counterbalance components in agriculture devices such as combine heads, and (2) tail weights in the curtain industry, particularly weights that are attached to curtains to stabilize them.

Accordingly, while a preferred embodiment of the invention has been described herein, it is appreciated that modifications are possible that are within the scope of the invention.

It is claimed and desired to secure by Letters Patent:

1. A polymer-based composite sports article capable of being used as a puck and consisting essentially of:
    a body formed from a first volume of curable rubber-based polymeric component, mixed with a second volume of iron ferrite particles such that the ratio of polymer to iron ferrite particles is in the range of about 1 part polymer to 1–1.5 parts iron ferrite particles by volume, with the body including a central substantially uncured section and an outer substantially cured section, the body being constructed in a generally spherical shape, and with a size and low-rebound property that accommodates use as a puck for playing hockey.

2. The sports article of claim 1 wherein the article has a specific gravity in the range of about 1.5–2.0.

3. A method of forming a filled rubber composite, low-rebound sports article capable of being used as a puck and comprising:

selecting a first amount of curable rubber-based resin;

selecting an amount of iron ferrite particles as a filler;

reserving a fraction of the curable rubber-based resin from the first amount;

mixing the unreserved portion of the first amount of the curable rubber-based resin with the amount of filler;

adding the reserved second amount of the curable rubber-based resin to the mixture; and repeating the mixing step until the ratio of rubber-based resin to iron ferrite particles is in the range of about 1 part rubber-based resin to 1–1.5 parts iron ferrite particles by volume thereby to form a rubber-filled composite;

molding the rubber-filled composite into a generally spherical shape: and undercuring the molded rubber-filled composite.

4. The method of claim 3 wherein the reserving step involves reserving plural fractions of the first amount of the curable rubber resin, and wherein the method further includes the step of performing the adding and repeating steps for each fraction.

5. The method of claim 3 wherein the reserving step includes cooling the reserved fraction of the first amount of the curable rubber resin.

6. The method of claim 4 wherein the reserving step includes cooling the reserved fractions of the first amount of the curable rubber resin.

* * * * *